United States Patent [19]
Hawkins

[11] 4,061,294
[45] Dec. 6, 1977

[54] AIRCRAFT WHEEL ROTATOR
[76] Inventor: St. Elmo Hawkins, 107 Preston Road, Lynchburg, Va. 24502
[21] Appl. No.: 761,498
[22] Filed: Jan. 21, 1977
[51] Int. Cl.² .............................................. B64C 25/36
[52] U.S. Cl. ................................................ 244/103 S
[58] Field of Search ............. 244/103 S, 53 B, 103 R; 180/1 FV, 1 P; 296/1 S; 415/2-4; 290/43-44, 54-55

[56] References Cited

U.S. PATENT DOCUMENTS
| | | | |
|---|---|---|---|
| 2,424,941 | 7/1947 | Musser et al. | 244/103 S |
| 2,665,087 | 1/1954 | Clover | 244/103 S |

FOREIGN PATENT DOCUMENTS
| | | | |
|---|---|---|---|
| 527,374 | 7/1956 | Canada | 244/103 S |
| 973,968 | 2/1951 | France | 415/4 |
| 2,109,563 | 9/1972 | Germany | 244/103 S |
| 629,789 | 4/1936 | Germany | 415/4 |

Primary Examiner—Galen L. Barefoot
Attorney, Agent, or Firm—Victor J. Evans & Co.

[57] ABSTRACT

An aircraft wheel rotator comprising plow like deflectors and fan like spokes on the wheels. The plow like deflectors have a bottom pan which causes air impinging thereon to be funneled downwardly and rearwardly with increased velocity, and thence backward to impinge on fan like spokes which are integral with the aircraft wheels. The result of having this air stream impinge on the fan like spokes of the wheels, the spokes being suitably oriented to provide resistance to the incoming air stream, is that the wheels will begin to spin due to the air flow before the aircraft has landed on the ground. This spin up effect of the wheels prior to landing minimizes flat spots on the tires due to wheels that are encountering the ground while stationary, and therefore provide additional life for the tires, as well as improved safety for the aircraft.

2 Claims, 7 Drawing Figures

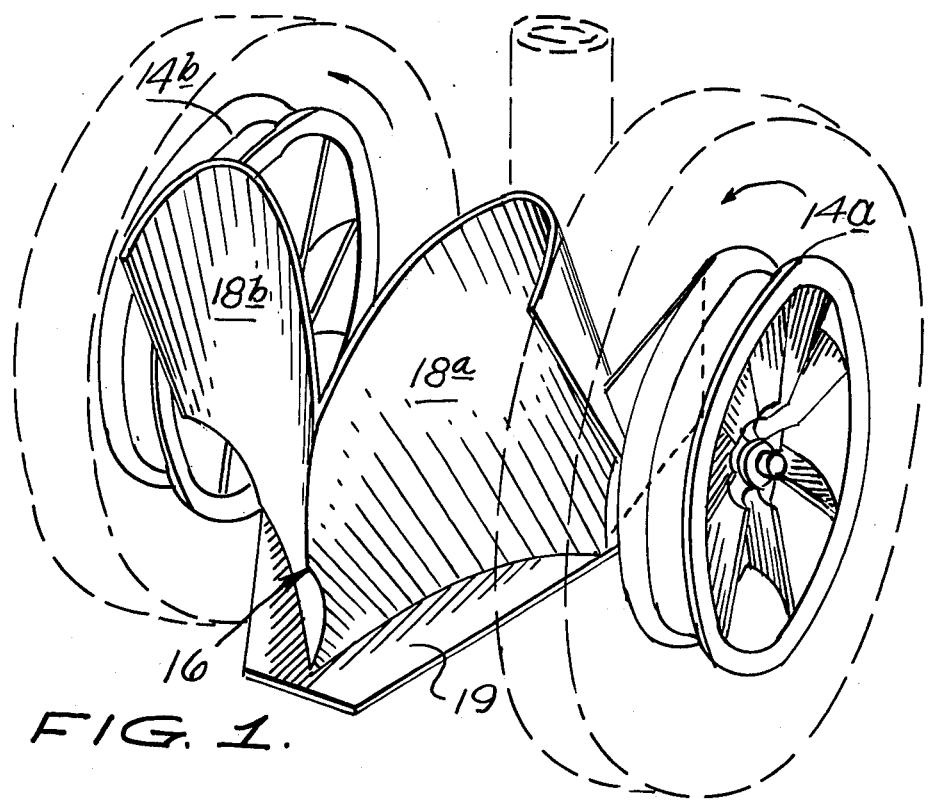
FIG. 1.
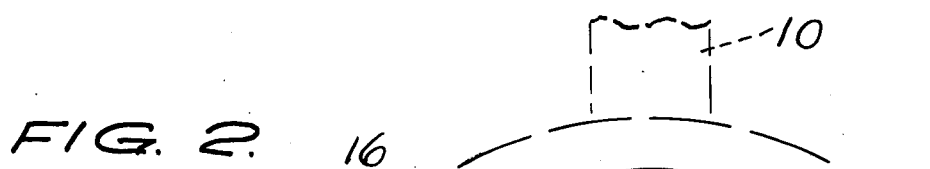
FIG. 2.
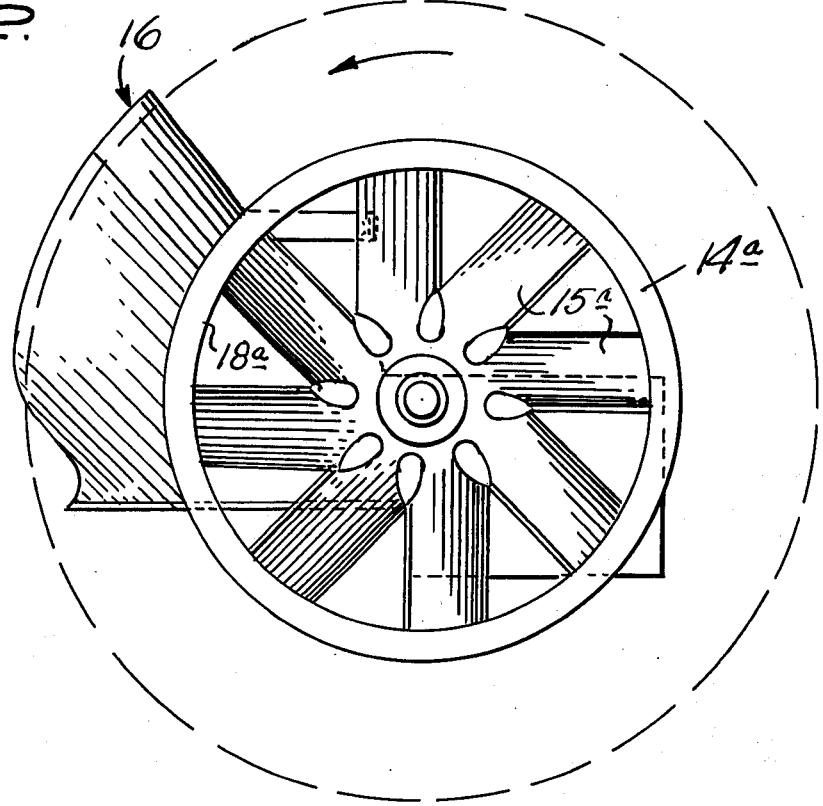

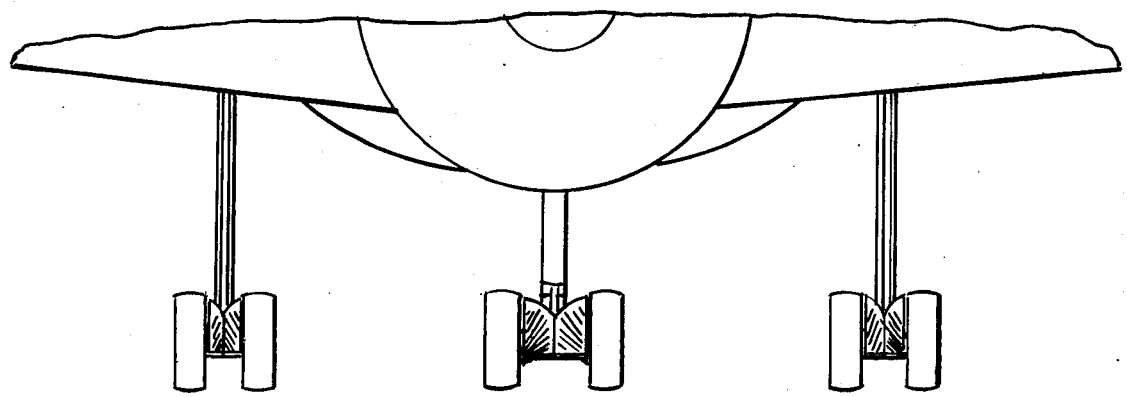
FIG. 5.
FIG. 6.
FIG. 7.
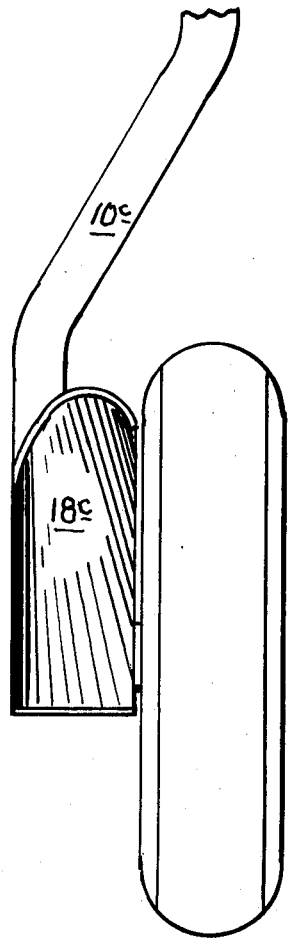
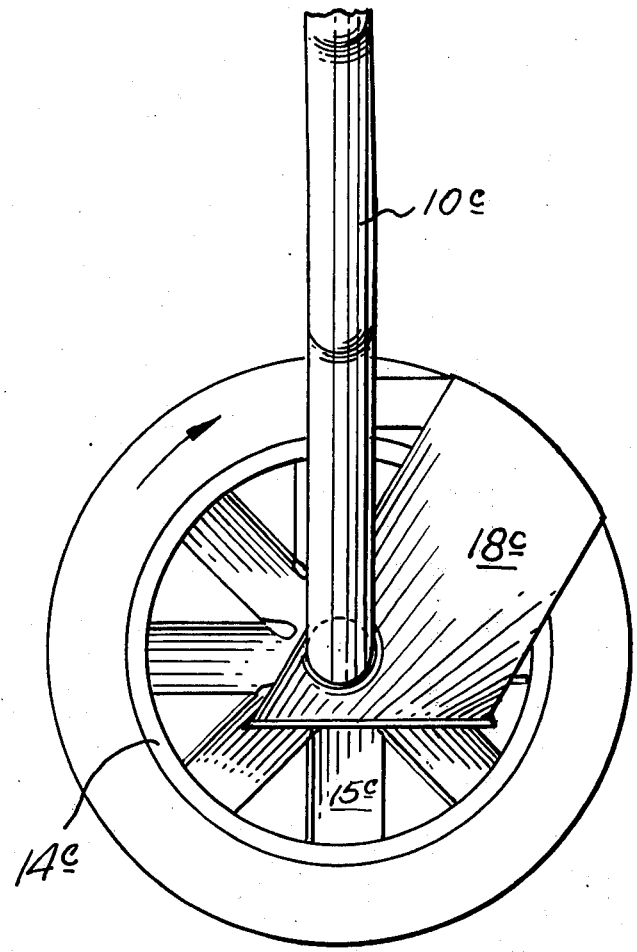

1

AIRCRAFT WHEEL ROTATOR

SUMMARY OF THE INVENTION

The wheels of an aircraft are not ordinarily driven. When the aircraft is on the ground it is propelled by it's propulsion engines running at a slow speed to develop the thrust required.

On take off the aircraft is taxied to the runway under such slow speed thrust of its engines. When in position on the runway the wheels maybe held by brakes until the thrust of the engines is increased, then, with the brakes off and the maximum thrust being developed, the aircraft takes off. No problem develops with the landing wheels in this operation.

Upon landing, however, if the wheels are not rotating in the direction they will be rotated by contact with the ground when the tire contacts the ground, the tire will be subjected to excessive wear while the rotational speed of the wheel is increased to accomodate the forward speed of the aircraft.

It is an object of this invention to provide means to drive the landing wheels of an airplane in the direction of force and motion of the plane so that the contact point of the tires of the landing wheels will have, as nearly as possible, no ground speed when the contact point hits the ground so that tire wear will be held to a minimum.

Other objects and advantages will become apparent in the following specification when considered in light of the attached drawings.

BRIEF DESCRIPTION OF THE DRAWINGS

FIG. 1 is a perspective view of the wheel rotator mounted on a two wheeled landing gear wheel unit with the tires omitted but shown in phantom;

FIG. 2 is a side view along the axis of the wheels of the wheel rotator of FIG. 1;

FIG. 5 is a front view of an airplane using the wheel rotator;

FIG. 6 is a front view of a single wheel landing element using the wheel rotator; and FIG. 7 is a side view of FIG. 6.

DESCRIPTION OF THE PREFERRED EMBODIMENT

Briefly stated the wheel rotator provides an air collector which is similar to a plow to force air, through which the wheel assembly passes, outwardly and downwardly to impinge on the spokes of the landing wheel with which the air collector is associated; the spokes being formed as the blades of a turbine to be driven by the air from the air collector.

Figure 3:
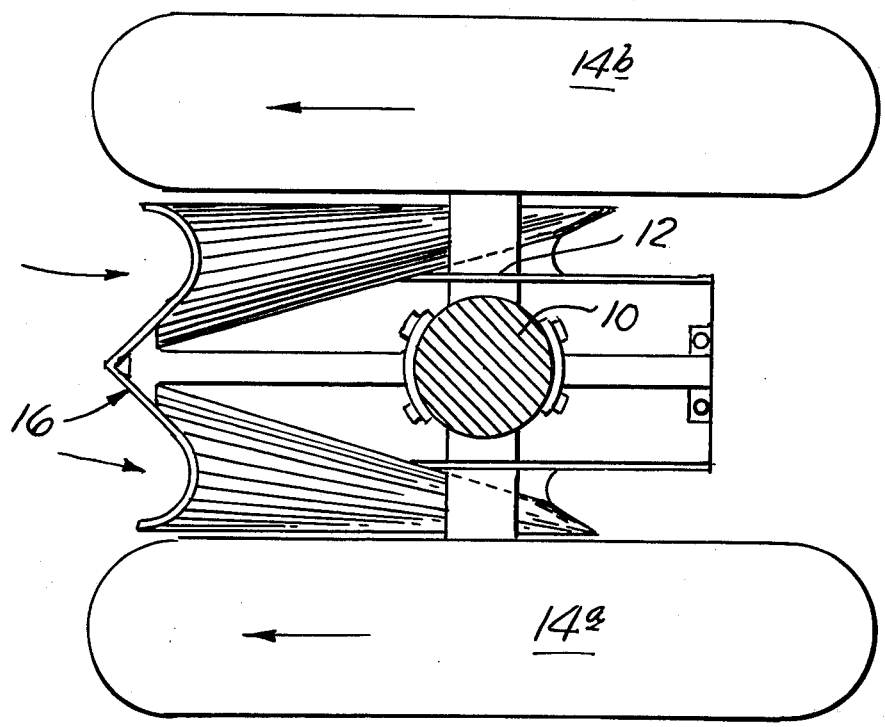
FIG. 3 is a plan view of the wheel rotator of FIGS. 1 and 2 with the tires mounted.
Figure 4:
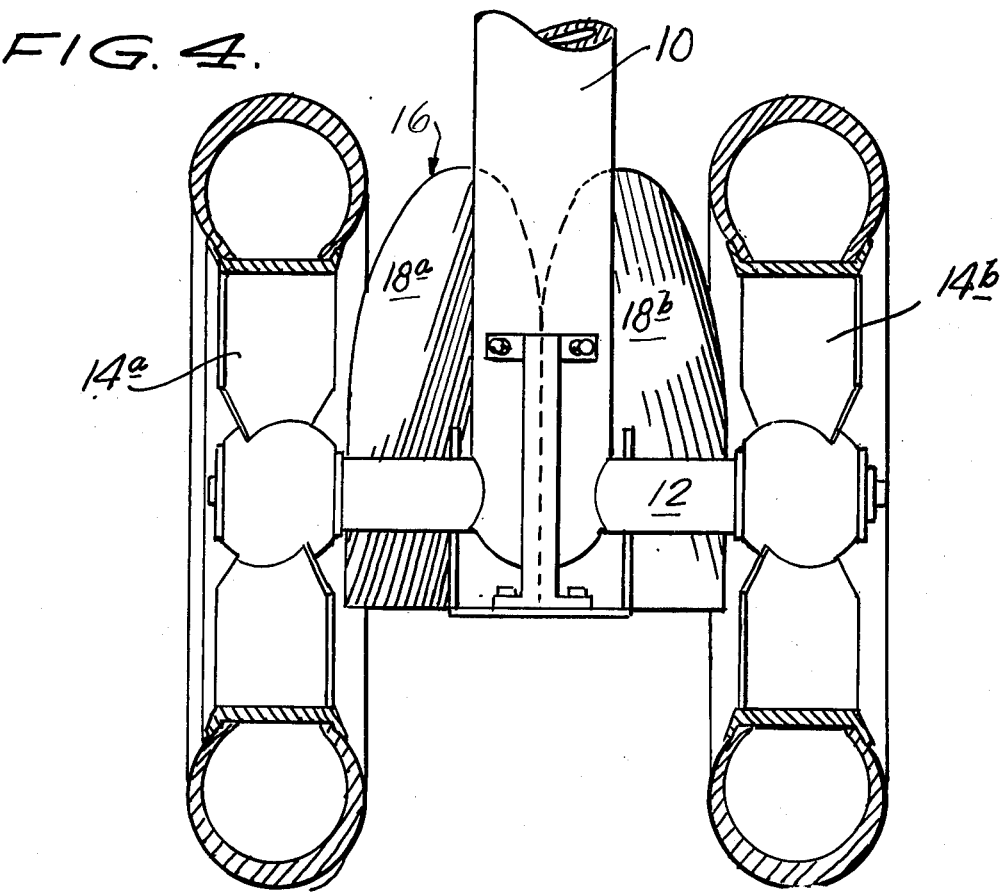
FIG. 4 is a view from the front, or from the left of FIG. 3 with the tires mounted.

Considering FIGS. 1, 2, 3 and 4 we see a strut 10, which, when the landing wheels are in us extends downwardly from the airplane body and carries an axle housing 12 at right angles to strut 10. Wheels 14a and 14b are mounted for free rotation on an axle carried by housing 12.

Between wheels 14a and 14b is a space into which an air collector 16 fits. It is not considered to be desireable for plow like air collector 16 to extend much beyond the cylinder of wheels 14a and 14b, and it is considered to be desireable to allow adequate ground clearance below housing 12.

Plow like air collector 16, in FIGS. 1 through 4 is symetrical about a central vertical plane made of two parts 18a and 18b each part being like the mold board of a plow so that air impinging on the faces of parts 18a and 18b will be forced downwardly and outwardly to the right from part 18a and to the left from part 18b.

As seen in FIG. 2 the air collector surfaces 18a and 18b are preferably terminated at their upper forward edges in a cylindrical projection approximately the cylindrical projection of wheels 14a and 14b plus their tires. The desireability of this is to facilitate storage of the assembly when retracted while the airplane is in flight. Collector surfaces 18a and 18b are bounded on their sides remote from wheels 14a and 14b respectively by a common plane passing through the center of strut 10. The lower edge of the collector surfaces 18a and 18b extend rearwardly and outwardly from the lowest point at which the surfaces of collectors 18a and 18b lie in the common plane which lowest point is somewhat below the housing 12, thence in a horizontal plane rearwardly and outwardly to a point adjacent spokes 15a or 15b as the case may be. A flat plate 19 closes the bottom of the air collector surfaces.

The front edge of air collector surfaces 18a and 18b preferably describe a curve from the highest point at which air collectors 18a and 18b lie in the common plane, upwardly and outwardly, thence downwardly to a point close to the rims of wheels 14a or 14b. The edges of the air collector surfaces 18a and 18b then downwardly adjacent to the spokes 15a or 15b to the plate 19 where the side edge of each air collector surface meets the bottom edge of that air collector surface. It is seen, then that the surfaces of the air collectors 18a and 18b resemble the mold board of a plow taking in air at their forward and upper portions and funnelling the air downwardly and outwardly to impinge on the spokes 15a or 15b in succession. As the air flowing through the air collectors is moved from the wide entrance to the smaller outlet and against the spokes, the air necessarily accellerates so it exerts considerable force against the turbine blade like spokes of the wheels to rotate the wheels in the direction to reduce or eliminate relative motion between the tires and the ground as the airplane touches down.

FIG. 5 shows a front view of an airplane having three wheel assemblys each paired wheels being provided with air collectors and spoked wheels as described above.

Many planes, however, have landing gear using but a single wheel such as seen in FIGS. 6 and 7. In FIGS. 6 and 7 a strut 10c carries a single wheel 14c. Strut 10c has an offset portion so that wheel 14c lies in the plane of strut 10c. An air collector having a surface 18c is mounted on the offset portion of strut 10c so that it does not add materially to the volume required to slow the wheel when it is retracted. The surface 18c is similar to the surfaces 18a and/or 18b as on a plane there will be two such wheels, one under each wing so they are mirror images of each other.

Having thus described the preferred embodiment of the invention it should be understood that numerous structural modifications and adaptations may be resorted to without departing from the spirit of the invention.

What is claimed is:

1. An aircraft wheel rotator for spinning up wheels having spokes prior to landing comprising: an air collector having an inwardly concave front edge with upper and lower terminal portions, said lower terminal portion connected to a rearwardly extending substantially flat plate, said air collector extending above and connected to said plate having a substantially conical configuration and having an open portion extending from the rearwardly disposed tip of the cone to said front edge so that air trapped between said flat plate and said air collector accelerates towards said tip of said cone and impinges upon the spokes of said wheel causing said wheel to spin up.

2. The device of claim 1 further including a second air collector disposed in mirror image symmetry with said first air collector about said front edge so that at least two wheels may be spun up simultaneously.